Figure 1:
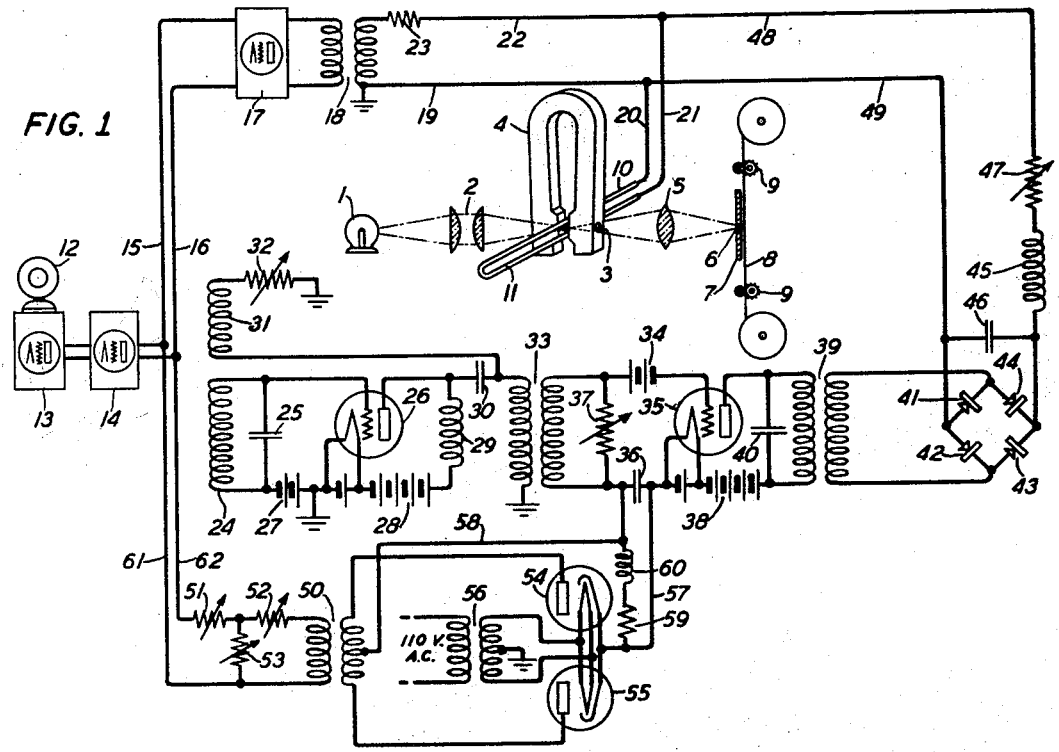

March 27, 1934.  J. B. HARLEY  1,952,861
RECORDING SYSTEM
Filed Oct. 20, 1932

INVENTOR
J. B. HARLEY
BY
G. H. Heydt.
ATTORNEY

Patented Mar. 27, 1934

1,952,861

UNITED STATES PATENT OFFICE 1,952,861

RECORDING SYSTEM

John B. Harley, New York, N. Y., assignor to Bell Telephone Laboratories, Incorporated, New York, N. Y., a corporation of New York Application October 20, 1932, Serial No. 638,783

19 Claims. (Cl. 179—100.3)

This invention relates to systems for recording signal currents, and particularly to systems in which the mean recording position of the recording device may be controllably varied from the center of the available range of the characteristic of the medium.

The object of the invention is to displace the mean recording position of the recording device from the center of the characteristic of the medium when recording signal currents of small amplitude, and to proportionally restore the mean recording position nearer to the center of the characteristic of the medium as the amplitude of the signal currents increases.

A feature of the invention resides in the employment of currents of high frequency in the circuit controlling the mean recording position of the recording device.

Another feature of the invention resides in modulating the high frequency control currents in accordance with the envelope of the amplitude variations of the signal currents to be recorded.

Another feature of the invention resides in controlling the mean recording position of the recording device by means of a control current obtained by rectifying and filtering the modulated high frequency currents.

A further feature of the invention is a storage device which is supplied with energy from the signal currents through a network of low resistance to regulate the operating time of the control circuit and discharges through a network of high resistance to regulate the restoring time of the control circuit.

In known recording systems, the recording device operates over a predetermined range of some selected characteristic of the recording medium. In the variable area method of recording sound on a photographic film the recording device operates over the width of the recording area laterally of the film and is limited by the predetermined maximum width of the sound record. In the variable density method of recording sound on a photographic film, the recording device operates over the exposure characteristic of the film and is limited to a predetermined range of photographic densities. In the known systems of recording, the recording device is adjusted so that, in the absence of signal currents, the mean recording position is in the center of the range of the characteristic, and is varied momentarily above and below this mean recording position by the variations in the current to be recorded.

As the known types of recording mediums are not perfectly homogeneous, a certain amount of undesired noise is produced during the reproduction of the record, due to irregularities in the record being reproduced. Recent experiments have shown that the noise currents produced during the reproduction of a photographic record are proportional to the mean value of the transmission of the record, that is, to the mean value of the scanning flux impressed on the light sensitive scanning device. By definition, the transmission of a photographic record is the ratio of the light transmitted through the record divided by the light incident on the record. Thus, if the mean value of the transmission of the reproduced record is at all times as small as possible the mean value of the flux impressed on the light sensitive device is small and the noise is a minimum. The reproduced or positive record will thus be darker than known records and the original or negative record will be more transparent. The exposure of the original or negative record must thus be as small as possible and may vary with a desired characteristic of the signal currents such as the variations in the envelope of the amplitude variations of the signal currents. The recording device is first mechanically adjusted so that the mean recording position is in the center of the available range of the selected characteristic of the medium. A controllable biasing current is then applied to the recording device to displace the mean recording position to the lower end of the available range of the characteristic, thus reducing the exposure of the original or negative record to some small value. When signal currents are applied to the recording system, this biasing current is varied in accordance with a selected characteristic of the signal currents such as the envelope of the amplitude variations of the signal currents, thus increasing and decreasing the mean value of the exposure of the original or negative record, and permitting the recording device to vary the instantaneous value of the exposure in accordance with the instantaneous variations in the amplitude of the signal currents without overrunning the limits of the selected range of the characteristic.

In accordance with the present invention, the output of a source of high frequency oscillations is modulated in accordance with the envelope of the amplitude variations of the signal currents to be recorded. The modulated high frequency oscillations are then rectified and the resulting current is applied to the recording device to displace the mean recording position.

One embodiment of the invention produces what may be termed a direct control of the mean recording position. The rectified output of the source of high frequency oscillations is applied to the recording device and adjusted so that, in the absence of signal currents to be recorded, the mean recording position is displaced to any desired degree. When the signal currents to be recorded are applied to the recording system, the rectified high frequency oscillations are decreased in accordance with the increase in the envelope of the amplitude variations of the signal currents and thus reduce the displacement of the mean recording position.

A second embodiment of the invention produces what may be termed an indirect control of the mean recording position. A unidirectional current or voltage is applied to the recording device and adjusted so that, in the absence of signal currents to be recorded, the mean recording position is displaced to any desired degree. Under these conditions, no rectified high frequency oscillations are applied to the recording device. When the signal currents to be recorded are applied to the recording system, rectified high frequency oscillations are applied to the recording device, and decrease the effect of the unidirectional biasing current in accordance with the envelope of the amplitude variations of the signal currents and thus reduce the mean displacement of the recording system.

A storage device, such as a capacitor, is connected in the input circuit of the modulator of the high frequency oscillator and is charged with energy derived from the signal currents through a low resistance asymmetrically conductive device. The modulator thus responds rapidly when signal currents are impressed on the control circuit. The storage device discharges through a high resistance network, thus the modulator responds slowly when the signal currents decrease or cease.

The instantaneous variations in the signal currents are independently applied to the recording device through a recording channel which is independent of the control circuit.

Figure 2:
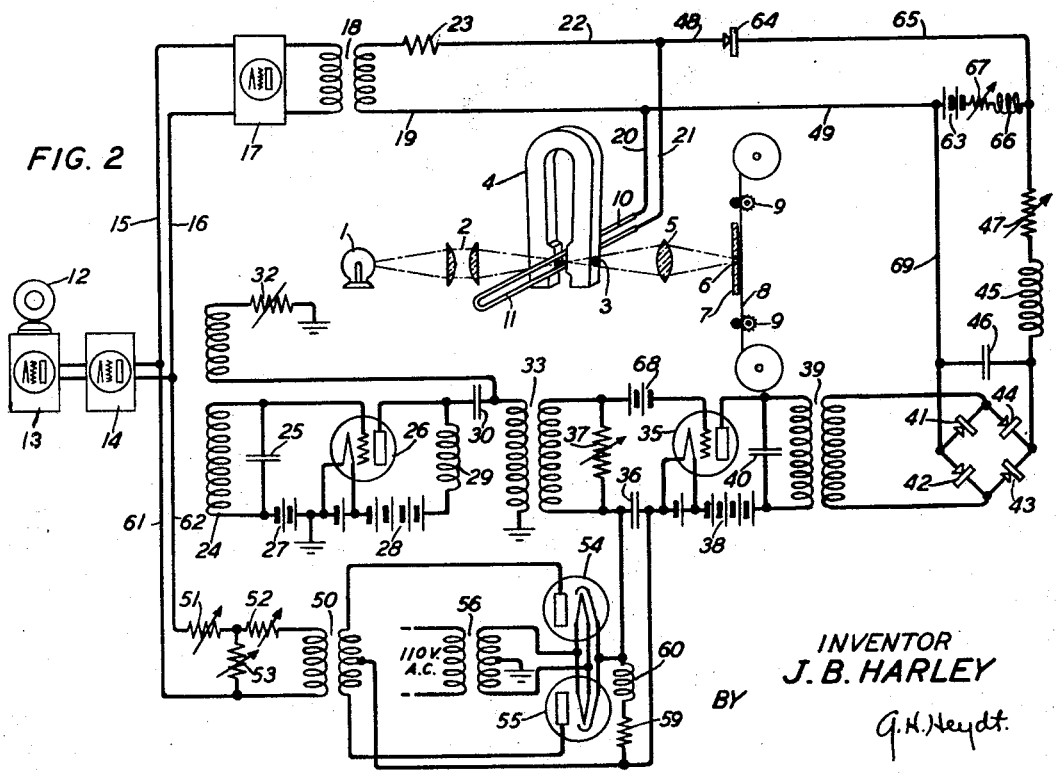

In the drawing:

Fig. 1 diagrammatically discloses a recording system having a direct control of the mean recording position;

Fig. 2 diagrammatically discloses a recording system having an indirect control of the mean recording position.

In Fig. 1, light from a source 1, is focused by a suitable lens system 2 on aligned apertures 3 pierced in the pole pieces of a permanent magnet 4. The light emerging from the apertures 3 is focused by a suitable lens system 5 on an aperture 6 pierced in an opaque plate 7. A light sensitive film 8 is traversed by the usual sprockets 9, 9 behind the plate 7 and is exposed to the light passing through the aperture 6. A pair of flat ribbon-like conductors 10, 11 immersed in the constant field of the magnet 4 define a light transmitting slot. The height of the slot formed between the ribbons 10, 11 limits the time of exposure of the film 8 to the light from the source 1.

The recording device thus briefly described is well known in the art and the present invention is not to be construed as limited in any way by the disclosure of a particular form of light valve. Any other suitable light valve may be substituted for the type shown without departing from the scope of the invention.

Acoustic waves are detected by the microphone 12 and the detected currents suitably amplified in the amplifiers 13, 14. A portion of the signal currents are supplied through wires 15, 16 to an amplifier 17. The output of the amplifier 17 is applied to the primary winding of a transformer 18. The signal currents from the secondary winding of the transformer 18 flow through wires 19 and 20, through ribbons 10 and 11, through wires 21 and 22 back to the transformer. A resistor 23 may be inserted in the circuit, if the impedance of the ribbons 10 and 11 is so low that difficulty is found in matching the impedance of the secondary winding of transformer 18 to the impedance of the ribbons 10 and 11.

The ribbons 10 and 11 are mechanically supported, adjusted and tensioned to define a light transmitting slot of such height that the resultant time of exposure of the film 8 will produce an exposure in the center of the selected range of the characteristic of the emulsion of the film 8. A description of the adjustment of a light valve of this type is given in an article "The principles of the light valve" by T. E. Shea, W. Herriott and W. R. Goehner published in the Journal of the Society of Motion Picture Engineers, Volume XVIII pages 697 to 730, June 1932. The magnetic field due to the signal currents flowing in the ribbons 10, 11 will react with the constant field due to the magnet 4 and cause the ribbons 10, 11 to vibrate and vary the height of the light transmitting slot in accordance with the instantaneous variations in the signal currents.

An inductor 24 shunted by a capacitor 25 is connected between the filament and control electrode of an oscillator 26. A grid battery 27 impresses a suitable potential on the control electrode of the oscillator 26. A plate battery 28 supplies current to the plate-filament circuit of the oscillator 26 through an inductor 29. The filament circuit of oscillator 26 may be grounded as shown. Oscillating currents flow through the capacitor 30, inductor 31 and resistor 32 to ground thence to the filament-plate circuit of the oscillator 26. Inductor 31 is magnetically coupled to inductor 24. The circuit will thus oscillate at a frequency determined by the inductor 24 and capacitor 25, and the amplitude may be controlled by the resistance 32.

The oscillator 26 and associated apparatus thus supplies a steady flow of high frequency current to the primary winding of transformer 33, thence through the winding and ground back to the filament of the oscillator. While one form of oscillator has been illustrated and described, it will be apparent that any other source of current of suitable frequency may be used. In general, a super-audible frequency of around 10,000 cycles will produce satisfactory results, but still higher frequencies may be used. In fact, a very wide range of frequencies will produce satisfactory results.

The high frequency voltage induced in the secondary winding of the transformer 33 is applied through a biasing battery 34 to the control electrode of a vacuum tube 35 and through a capacitor 36 to the filament of vacuum tube 35. The amplitude of the voltage applied to the control electrode may be varied by the variable resistor 37. A battery 38 supplies current to the plate circuit of the vacuum tube 35 through the primary winding of a transformer 39. The varying voltage applied to the control electrode of the vacuum tube 35 causes a corresponding variation in the current flowing in the primary winding of transformer 39. A capacitor 40 broadly tunes the primary winding of transformer 39 to the frequency of the high frequency currents.

The currents induced in the secondary winding of the transformer 39 are rectified in a full wave rectifier, which may take the form of a bridge formed by the elements 41, 42, 43, 44, which may be the known copper-copper oxide couples.

The pulsating current from the bridge connected rectifiers 41, 42, 43, 44 is smoothed by the filter formed by the inductor 45 and capacitor 46. The filtered current flows through variable resistor 47, wires 48 and 21, through ribbons 11 and 10, wires 20 and 49 back to the rectifier. This unidirectional current will cause the ribbons 10 and 11 to be drawn together, reducing the height of the light transmitting slot and thus reducing the time of exposure of the film 8. The time of exposure is reduced until in the absence of signal currents, the exposure is at the lower end of the selected range of the characteristic of the recording medium. The magnitude of the pulsating current may be adjusted by varying the resistors 32, 37 and 47.

A portion of the signal currents flows through wires 61, 62 to the primary winding of transformer 50. The supply of signal currents may be controlled by the constant impedance potentiometer formed by the variable resistors 51, 52, 53. The voltage induced in the secondary winding of transformer 50 is applied to the anodes of the full wave rectifier formed by the vacuum tubes 54, 55. The cathodes of the vacuum tubes 54, 55 may be heated in a known manner by power from a local supply stepped down in the transformer 56 and supplied to the heater elements of the vacuum tubes 54, 55. The rectified output of the vacuum tubes 54, 55 flows over wire 57 and charges the condenser 36 to a positive potential. The negative charge on condenser 36 flows over wire 58 back to the transformer. The charging of the condenser 36 impresses a negative potential on the control electrode of the modulator 35, reducing the amplifying power of the modulator 35, thus reducing the rectified current supplied to the ribbons 10 and 11 and permitting the ribbons 10 and 11 to increase the average height of the light transmitting slot.

While the rectifying elements 54, 55 have been shown as thermionic diodes, it will be apparent that many other forms of rectifiers may be used. The choice of the rectifying elements 54, 55 is limited by certain conditions inherent in the operation of the circuit. In the absence of signal currents, the ribbons 10, 11 are drawn close together, the height of the light transmitting slot is small and the load carrying capacity of the light valve is correspondingly small. If a wave of signal current of large amplitude is suddenly applied to the circuit, the height of the light transmitting slot must be suddenly increased or the wave will exceed the load carrying capacity of the light valve, that is, the light valve will be overloaded and the record distorted. The operating time of the control circuit is largely controlled by the rapidity with which the condenser 36 may receive its full charge. Thus, the internal resistance of the rectifying elements 54, 55 should be as small as practical so that the condenser 36 may charge up rapidly to its full potential, thus rapidly reducing the amplification of the modulator 35 and the biasing current which is drawing the ribbons 10, 11 together.

When the wave of signal current decreases in magnitude or ceases, it is important that the control circuit should not restore too quickly. If the control circuit were designed to operate and restore quickly, the spacing of the ribbons 10, 11 would be varied by the control circuit in accordance with each major wave of the signal current. This would be equivalent to a modulation of the recording light superimposed on the desired modulation due to the signal currents from transformer 18 and would produce a distortion of the record. Thus the control circuit should restore fairly slowly, so that the load carrying capacity of the valve may vary approximately with the envelope of the variations in the signal currents. The restoring time, however, is also limited by another factor. When the load carrying capacity of the valve increases, the ground noise increases accordingly but is normally masked by the loudness of the reproduced sound. It has been found, however, that any sudden change in the ground noise will be perceptible to the hearer. Thus, even if the wave of signal current suddenly ceases, the ground noise should only decrease gradually.

A novel feature of the invention resides in the means whereby the operating time of the circuit is very short while the restoring time is comparatively long and is adjustable substantially independently of the operating time. As explained hereinbefore, the operating time is largely determined by the charging time of capacitor 36 through the impedance of the rectifiers 54, 55. The capacitor 36, however, can not discharge through the rectifiers 54, 55 and is compelled to discharge through the resistor 59 and the inductor 60. By selecting the proper values for the capacitance of the capacitor 36 and for the resistance of the resistor 59, the restoring time may be made comparatively long. The inductor 60 prevents the rapidly increasing charging current from being short circuited through the resistor 59. The inductor 60 and capacitor 36 also form a low frequency resonant circuit that aids in causing the load carrying capacity of the light valve to vary with the envelope of the minor variations in the amplitude of the signal currents.

In Fig. 2, the elements of the circuit having the same functions as similar elements in Fig. 1 have been similarly identified. As the operation of the circuit illustrated in Fig. 2 is generally similar to the operation of the circuit illustrated in Fig. 1, a detailed description of the operation of the circuit illustrated in Fig. 2 does not appear to be necessary.

In Fig. 2, the ribbons 10, 11 of the light valve are mechanically adjusted to define a light transmitting slot of normal height. A current flows from battery 63, through wires 49 and 20, ribbons 10 and 11, wires 21 and 48, unilaterally conductive device 64, wire 65, inductor 66, variable resistor 67 to battery 63. This unidirectional current causes the ribbons 10, 11 to be drawn together and, in the absence of signal currents, to reduce the height of the light transmitting slot to a small value. The magnitude of the unidirectional current may be adjusted by the variable resister 67.

In Fig. 1, the battery 34 applied a biasing potential to the control electrode of the modulator 35 of such value that, in the absence of signal currents, the modulator was operating with normal amplification in the center of its characteristic. In Fig. 2, the battery 68 applies a biasing potential to the control electrode of the modulator 35 of such value that, in the absence of signal currents, the amplification of the modulator is substantially zero. Thus in Fig. 1, in the absence of signal currents, the high frequency currents transmitted from the oscillator 26 to the transformer 39 are a maximum. In Fig. 2, in the absence of signal currents, the high frequency currents transmitted from the oscillator 26 to the transformer 39 are substantially zero.

When signal currents are flowing in the circuit shown in Fig. 2 the rectified signal currents from the full wave rectifier 54, 55 charge the capacitor 36 to such polarity that a positive potential is supplied to the control electrode of the modulator 36 and partially neutralizes the potential of the battery 68 thus increasing the amplification of the modulator 35 and allowing high frequency currents to be supplied to the transformer 39.

The high frequency currents from transformer 39 are then rectified by the bridge connected elements 41, 42, 43, 44 and flow through inductor 45, resistor 47, inductor 66, resistor 67, battery 63, wire 69 back to the rectifier. The increased current flowing in the inductor 66 and resistor 67 increases the voltage lost in these elements, thus reducing the voltage available to force current through the ribbons 10, 11. The current flowing in the ribbons 10, 11 thus decreases, the spacing of the ribbons increases and the load carrying capacity of the light valve increases. The unilaterally conductive device 64 prevents the biasing current flowing in the ribbons 10, 11 from being reversed by the rectifier high frequency currents, thus preventing the light valve from exceeding the upper limit of the selected range of the film characteristic.

What is claimed is:

1. The method of recording signal currents on a sensitive medium which comprises actuating a recording device by and in accordance with the instantaneous variations of said signal currents, moving a sensitive medium at constant speed past the recording point, generating a current of constant frequency, controlling the output of said generator in accordance with a characteristic of said signal currents, detecting said controlled output, and applying the product of said detection to said recording device whereby the load carrying capacity of said device is varied in accordance with said characteristic of the signal currents.

2. The method of recording signal currents on a sensitive medium which comprises actuating a recording device by and in accordance with the instantaneous variations of said signal currents, moving a sensitive medium at constant speed past the recording point, locally generating a current of constant frequency, controlling the output of said generator in accordance with the envelope of the amplitude variations of said signal currents, detecting said controlled output and applying the product of said detection to said recording device whereby the load carrying capacity of said recording device is varied in accordance with the envelope of the amplitude variations of said signal currents.

3. The method of recording signal currents on a sensitive medium which comprises actuating a recording device by and in accordance with the instantaneous variations of said signal currents, moving a sensitive medium at constant speed past the recording point, generating a current of constant frequency, amplifying the output of said generator, controlling the degree of amplification of said output in accordance with a characteristic of said signal currents, detecting said controlled output and applying the product of said detection to said recording device whereby the load carrying capacity of said device is varied in accordance with said characteristic of the signal currents.

4. The method of recording signal currents on a sensitive medium which comprises actuating a recording device by and in accordance with the instantaneous variations of said signal currents, moving a sensitive medium at constant speed past the recording point, generating a current of constant frequency, amplifying the output of said generator, controlling the degree of amplification of said output in accordance with the envelope of the amplitude variations of said signal currents, detecting said controlled output and applying the product of said detection to said recording device whereby the load carrying capacity of said device is varied in accordance with the envelope of the amplitude variations of said signal currents.

5. The method of recording signal currents on a sensitive medium which comprises moving a sensitive medium at constant speed past the recording point, generating a current of constant frequency, detecting said generated current, applying the product of said detection to the recording device whereby the load carrying capacity of said recording device is reduced, controlling said detected current in accordance with a characteristic of the signal currents and actuating the recording device by and in accordance with the instantaneous variations of said signal currents.

6. The method of recording signal currents on a sensitive medium which comprises moving a sensitive medium at constant speed past the recording point, generating a current of constant frequency, detecting said generated current, applying said detected current to the recording device whereby the load carrying capacity of said recording device is reduced, controlling said detected current inversely in accordance with the envelope of the amplitude variations of the signal currents and actuating the recording device by and in accordance with the instantaneous variations of the signal currents.

7. The method of recording signal currents on a sensitive medium which comprises moving a sensitive medium at constant speed past the recording point, generating a current of constant frequency, amplifying said generated current, detecting said generated current, applying said detected current to the recording device whereby the load carrying capacity of said said recording device is reduced, controlling the degree of amplification of said generated current inversely in accordance with the envelope of the amplitude variations of the signal currents and actuating the recording device by and in accordance with the instantaneous variations of the signal currents.

8. The method of recording signal currents on a sensitive medium which comprises moving a sensitive medium at constant speed past the recording point, applying a unidirectional current to the recording device whereby the load carrying capacity of said recording device is reduced, generating a current of constant frequency detecting said generated current, applying said detected current to oppose the effect of said unidirectional current on the recording device, controlling said detected current in accordance with the characteristic of the signal currents and actuating the recording device by and in accordance with the instantaneous variations of said signal currents.

9. The method of recording signal currents on a sensitive medium which comprises moving a sensitive medium at constant speed past the recording point, applying a unidirectional current to the recording device whereby the load carrying capacity of said recording device is reduced, generating a current of constant frequency, detecting said generated current, applying said detected current to oppose the effect of said unidirectional current on the recording device, controlling said detected current in accordance with the envelope of the amplitude variations of the signal currents and actuating the recording device by and in accordance with the instantaneous variations of the signal currents.

10. The method of recording signal currents on a sensitive medium which comprises moving a sensitive medium at constant speed past the recording point, applying a unidirectional current to the recording device whereby the load carrying capacity of said recording device is reduced, generating a current of constant frequency, amplifying said generated current, rectifying said amplified current, applying said rectified current to oppose the effect of said unidirectional current on the recording device, controlling the degree of amplification of said generated current in accordance with the envelope of the amplitude variations of the signal currents and actuating the recording device by and in accordance with the instantaneous variations of the signal currents.

11. In combination, a source of signal currents, a recording device actuated by the instantaneous variations in said signal currents, a sensitive medium, means for moving said medium at constant speed past the recording point of said device, a source of current of constant frequency, means for detecting the output of said source, means for applying the product of said detection to said recording device, and means energized by signal currents to vary said detected output in accordance with the envelope of the amplitude variations of said signal currents.

12. In combination, a source of signal currents, a recording device actuated by the instantaneous variations in said signal currents, a sensitive medium, means for moving said medium at constant speed past the recording point of said device, a source of current of constant frequency, means for rectifying the output of said source, means for filtering the output of said rectifying means, means for applying said filtered output to reduce the load carrying capacity of said recording device and means energized by said signal currents to vary said filtered output inversely in accordance with the envelope of the amplitude variations of said signal currents.

13. In combination, a source of signal currents, a recording device actuated by the instantaneous variations in said signal currents, a sensitive medium, means for moving said medium at constant speed past the recording point of said device, an oscillator, means for rectifying the output of said oscillator, a filter in the output of said rectifying means, means for applying said filtered output to reduce the load carrying capacity of said recording device, means for rectifying a portion of said signal currents, a filter in the output of said signal rectifying means, and means for applying said rectified and filtered signal current to control the output of said oscillator.

14. In combination, a source of signal currents, a recording device actuated by the instantaneous variations in said signal currents, a sensitive medium, means for moving said medium at constant speed past the recording point of said device, an oscillator, means for rectifying the output of said oscillator, a filter in the output of said rectifying means, means for applying said filtered output to reduce the load carrying capacity of said recording device, means for rectifying signal currents from said source, a resistor and an inductor in serial relation with said rectifying means, a capacitor in parallel relation with said resistor and said inductor, and means for applying the potential difference across said capacitor to control the output of said oscillator.

15. In combination, a source of signal currents, a recording device actuated by the instantaneous variations in said signal currents, a sensitive medium, means for moving said medium at constant speed past the recording point of said device, an oscillator, means for amplifying the output of said oscillator, means for rectifying signal currents from said source, a capacitor in serial relation with said rectifying means and with the input circuit of said amplifying means, a resistor and an inductor in parallel relation with said capacitor, means for rectifying the output of said amplifying means, a filter in the output of said rectifying means, and means for applying said filtered output to reduce the load carrying capacity of said recording device.

16. In combination, a source of signal currents, a recording device actuated by the instantaneous variations in said signal currents, a sensitive medium, means for moving said medium at constant speed past the recording point of said device, a source of unidirectional current, means for applying said unidirectional current to reduce the load carrying capacity of said recording device, a source of current of constant frequency, means for detecting the output of said source, means for applying the product of said detection to oppose the effect of said unidirectional current on said recording device and means energized by signal currents to vary the detected output in accordance with the envelope of the amplitude variations of the signal currents.

17. In combination, a source of signal currents, a recording device actuated by said signal currents, a sensitive medium, means for moving said medium at constant speed past the recording point of said device, a source of unidirectional current, means for applying said unidirectional current to reduce the load carrying capacity of said device, a source of current of constant frequency, means for rectifying the output of said source, means for filtering the output of said rectifying means, means for applying said filtered output to oppose the effect of said unidirectional current on said device and means energized by signal currents to vary the filtered output in accordance with the envelope of the amplitude variations of the signal currents.

18. In combination, a source of signal currents, a recording device actuated by signal currents, a sensitive medium, means for moving said medium at constant speed past the recording point of said device, a source of unidirectional current, means for applying said unidirectional current to reduce the load carrying capacity of said device, an oscillator, means for rectifying the output of said oscillator, a filter in the output of said rectifying means, means for applying said filtered output to oppose the effect of said unidirectional current on said device, and means energized by signal currents to vary the filtered output in accordance with the envelope of the amplitude variations of the signal currents.

19. In combination, a source of signal currents, a recording device actuated by signal currents, a sensitive medium, means for moving said medium at constant speed past the recording point of said device, a source of unidirectional current, means for applying said unidirectional current to reduce the load carrying capacity of said device, an oscillator, means for amplifying the output of said oscillator, means for rectifying signal currents from said source, a capacitor in serial relation with said rectifying means and with the input of said amplifying means, a resistor and an inductor in parallel relation with said capacitor, means for rectifying the output of said amplifier, a filter in the output of said rectifying means, and means for applying said filtered output to oppose the effect of said unidirectional current on said device.

JOHN B. HARLEY.